United States Patent
Min et al.

(10) Patent No.: US 11,958,986 B2
(45) Date of Patent: Apr. 16, 2024

(54) ANTIBACTERIAL POLYMER COATING COMPOSITION AND ANTIBACTERIAL POLYMER FILM

(71) Applicant: LG CHEM, LTD., Seoul (KR)

(72) Inventors: Jeehyon Min, Daejeon (KR); Mingoo Kim, Daejeon (KR); Miyeon Oh, Daejeon (KR); Jinkyu Lee, Daejeon (KR); Hong Shik Shim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 527 days.

(21) Appl. No.: 17/272,026

(22) PCT Filed: Apr. 1, 2020

(86) PCT No.: PCT/KR2020/004455
§ 371 (c)(1),
(2) Date: Feb. 26, 2021

(87) PCT Pub. No.: WO2020/204599
PCT Pub. Date: Oct. 8, 2020

(65) Prior Publication Data
US 2021/0348018 A1 Nov. 11, 2021

(30) Foreign Application Priority Data

Apr. 1, 2019 (KR) .................. 10-2019-0037788

(51) Int. Cl.
*C09D 171/08* (2006.01)
*C08K 5/315* (2006.01)
(Continued)

(52) U.S. Cl.
CPC ............ *C09D 171/08* (2013.01); *C08K 5/315* (2013.01); *C09D 5/14* (2013.01); *C09D 7/63* (2018.01);
(Continued)

(58) Field of Classification Search
CPC combination set(s) only.
See application file for complete search history.

(56) References Cited

U.S. PATENT DOCUMENTS

| | | | |
|---|---|---|---|
| 2001/0020049 A1* | 9/2001 | Takase | C03C 25/1065 528/65 |
| 2012/0208035 A1* | 8/2012 | Iwamoto | C09D 7/62 524/358 |

(Continued)

FOREIGN PATENT DOCUMENTS

| | | |
|---|---|---|
| CN | 1314933 A | 9/2001 |
| CN | 102405264 A | 4/2012 |

(Continued)

OTHER PUBLICATIONS

International Search Report issued for International Application No. PCT/KR2020/004455 dated Jul. 10, 2020, 4 pages.

(Continued)

*Primary Examiner* — Peter A Salamon
(74) *Attorney, Agent, or Firm* — ROTHWELL, FIGG, ERNST & MANBECK, P.C.

(57) ABSTRACT

The present disclosure relates to: an antibacterial polymer coating composition comprising a (meth)acrylic polyol resin, which has a number average molecular weight of 3,000-20,000, a (co)polymer containing an ethylene glycol repeating unit, and a photosensitizer; an antibacterial polymer film comprising a cured product of the antibacterial polymer coating composition; and an antibacterial polymer film which comprises a substrate layer and a photosensitizer, the substrate layer comprising a (meth)acrylic polyol resin having a number average molecular weight of 3,000-20,000 and a (co)polymer containing an ethylene glycol repeating unit, and the photosensitizer being dispersed in the substrate layer.

14 Claims, 1 Drawing Sheet

(51) Int. Cl.
    *C09D 5/14*     (2006.01)
    *C09D 7/63*     (2018.01)
    *C09D 133/10*     (2006.01)
    *C09D 171/02*     (2006.01)

(52) U.S. Cl.
    CPC ......... *C09D 133/10* (2013.01); *C09D 171/02* (2013.01)

(56) References Cited

U.S. PATENT DOCUMENTS

| | | |
|---|---|---|
| 2012/0309874 A1 | 12/2012 | Takimoto et al. |
| 2018/0086938 A1 | 3/2018 | Schaefer et al. |

FOREIGN PATENT DOCUMENTS

| | | |
|---|---|---|
| CN | 103965731 A | 8/2014 |
| CN | 105824191 A | 8/2016 |
| CN | 106497299 A | 3/2017 |
| CN | 108047920 A | 5/2018 |
| EP | 0656378 A1 | 6/1995 |
| EP | 1770135 A1 | 4/2004 |
| EP | 3546529 A1 | 10/2019 |
| JP | H07-239548 A | 9/1995 |
| JP | H11-228908 A | 8/1999 |
| JP | 2000-239968 A | 9/2000 |
| JP | 2018-517013 A | 6/2018 |
| KR | 10-2012-0101702 A | 9/2012 |
| KR | 10-2014-0080863 A | 7/2014 |
| KR | 10-1465964 B1 | 11/2014 |
| KR | 10-2018-0053836 A | 5/2018 |
| KR | 10-2019-0044971 A | 5/2019 |
| WO | 2011-013497 A1 | 2/2011 |
| WO | 2011-083635 A1 | 7/2011 |
| WO | 2019-083259 A1 | 5/2019 |

OTHER PUBLICATIONS

Khazna Alenezi et al., "Optimizing Zn porphyrin-based photosensitizers for efficient antibacterial photodynamic therapy", Photodiagnosis and Photodynamic Therapy 17 (2017), pp. 154-159.

Extended European Search Report dated Sep. 3, 2021, issue for the corresponding European Patent Application No. 20785003.3, 6 pages.

* cited by examiner

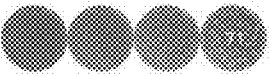

ANTIBACTERIAL POLYMER COATING COMPOSITION AND ANTIBACTERIAL POLYMER FILM

CROSS-REFERENCE TO RELATED APPLICATION(S)

This application is a 35 U.S.C. 371 National Phase Entry Application from PCT/KR2020/004455 filed on Apr. 1, 2020 and designating the United States and claims the benefit of Korean Patent Application No. 10-2019-0037788 filed on Apr. 1, 2019 with the Korean Intellectual Property Office, the disclosures of which are incorporated herein by reference in their entirety.

TECHNICAL FIELD

The present disclosure relates to an antibacterial polymer coating composition and an antibacterial polymer film.

BACKGROUND OF THE INVENTION

A photosensitizer absorbs light to produce reactive oxygen species (ROS), and a photodynamic therapy (PDT) is widely used, in which the photosensitizer is excited upon irradiation with light of a specific wavelength from the outside to generate active oxygen species or free radicals, thereby inducing apoptosis of various lesions or cancer cells and destroying them.

Various attempts have been made to develop polymer materials having antibacterial activity by using such photodynamic reaction. For example, a method of melting a silicone resin and the like, and then mixing the melted resin with a photosensitizer, or a method of using a coating solution formed by dissolving a silicone resin and a photosensitizer in a solvent are disclosed in Korean Patent No. 10-1465964, and the like.

However, according to the method of melting a silicone resin and the like and then mixing the melted resin with a photosensitizer, since the dispersibility between the photosensitizer and the silicone resin is low, the photosensitizer in the silicone resin can be aggregated without being homogeneously distributed. In addition, when melted with the silicone resin, since it is impossible to adjust the thickness of the silicone after melting, there is a limitation in that it is not easy to produce products in accordance with the applied fields or uses, or it is not suitable for mass production.

Moreover, when a coating solution formed by dissolving a silicone resin and a photosensitizer in a solvent is used, it is known that a certain level of antibacterial properties can be achieved without being largely limited in the field of application. However, it is not easy to produce active oxygen to such an extent that sufficient antibacterial activity can be exhibited when light in the visible light region is used, and the produced active oxygen is present only for a very short period of time. Thus, there is a limitation in that an excessive amount of light energy must be irradiated for a relatively long period of time.

BRIEF SUMMARY OF THE INVENTION

The present disclosure provides an antibacterial polymer coating composition which can maintain high antibacterial activity for a long period of time even when using light in a visible light region, and can provide an antibacterial material suitable for a mass production process.

The present disclosure also provides an antibacterial polymer film which can maintain high antibacterial activity for a long period of time even when using light in a visible light region.

In one aspect, there is provided an antibacterial polymer coating composition comprising a (meth)acrylic polyol resin having a number average molecular weight of 3,000 to 20,000; a (co)polymer containing an ethylene glycol repeating unit; and a photosensitizer.

In another aspect, there is provided an antibacterial polymer film comprising a cured product of the antibacterial polymer coating composition.

In a further aspect, there is provided an antibacterial polymer film comprising a substrate layer and a photosensitizer, the substrate layer comprising a (meth)acrylic polyol resin having a number average molecular weight of 3,000 to 20,000 and a (co)polymer containing an ethylene glycol repeating unit, and the photosensitizer being dispersed in the substrate layer.

DETAILED DESCRIPTION OF THE INVENTION

Hereinafter, the antibacterial polymer coating composition and the antibacterial polymer film according to a specific embodiment of the present disclosure will be described in more detail.

As used herein, the (meth)acrylate is meant to include both acrylate and methacrylate.

Also, as used herein, the (co)polymer is meant to include both a homo-polymer and a co-polymer.

According to one embodiment of the present disclosure, an antibacterial polymer coating composition can be provided, comprising: a (meth)acrylic polyol resin having a number average molecular weight of 3,000 to 20,000; a (co)polymer containing an ethylene glycol repeating unit; and a photosensitizer.

The present inventors have found through experiments that a coating film or molded article provided from an antibacterial polymer coating composition prepared by mixing a (meth)acrylic polyol resin having a number average molecular weight of 3,000 to 20,000 and a (co)polymer containing an ethylene glycol repeating unit together with a photosensitizer not only can maintain high antibacterial activity for a long period of time even when using light in the visible light region (380 nm to 780 nm), but also can control the antibacterial activity in an appropriate range according to the purpose of use, thereby completing the present disclosure.

Thereby, the antibacterial polymer coating composition of the embodiment not only is easily applicable to various fields and is suitable for mass production, but also achieve high antibacterial activity even when applying light in the visible light region during production of an actual coating film or a coated molded product, and further, the generated active oxygen remains for a long time compared to previously known antibacterial materials and thus can achieve high antibacterial efficiency.

When light in a visible light region is irradiated to such a polymer film or a polymer molded article provided from the antibacterial polymer coating composition of the embodiment, active oxygen species or free radicals are generated from the photosensitizer contained in the polymer film or the polymer molded article. As described above, due to the synergistic action of the components contained in the antibacterial polymer coating composition, active oxygen can be generated more efficiently and also the time for which active oxygen remains can be greatly increased.

This is believed to be due to the combined use of the (meth)acrylic polyol resin having a number average molecular weight of 3,000 to 20,000 and a (co)polymer containing an ethylene glycol repeating unit.

Specifically, the (co)polymer containing the ethylene glycol repeating unit is a hydrophilic group, which will make the antibacterial coating surface as a hydrophilic surface, thereby facilitating access to bacteria present in the aqueous solution and improving antibacterial activity. It is considered that the diffusion range of $^1O_2$ is within a certain distance from the antibacterial coating surface, and the hydrophobic surface allows the solution containing the bacteria to be farther than the diffusion range of $^1O_2$, so that the antibacterial effect does not exhibit well, and the hydrophilic surface exhibits antibacterial performance well because the solution containing bacteria is located within the diffusion range of $^1O_2$.

Specifically, the (meth)acrylic polyol resin having a number average molecular weight of 3,000 to 20,000 serves as a binder resin in the antibacterial polymer coating composition and the polymer film or polymer molded article provided therefrom, and can act to firmly support the photosensitizer.

When the number average molecular weight of the (meth) acrylic polyol resin is too low, the coating film may be brittle and fragile and it may be difficult to form a coating layer. Further, when the number average molecular weight of the (meth)acrylic polyol resin is too high, the surface of the coating layer is soft and thus, can be easily scratched and sticky, making it difficult to form the coating layer.

The number average molecular weight of the (meth) acrylic polyol resin may be a number average molecular weight using polystyrene calibration measured by a GPC method.

The (meth)acrylic polyol resin having a number average molecular weight of 3,000 to 20,000 may be a copolymer between one or more (meth)acrylate-based monomers and one or more hydroxy(meth)acrylate-based monomers, and more specifically, it may be a copolymer formed from a monomer mixture including an alkyl (meth)acrylate having 1 to 10 carbon atoms; a hydroxyalkyl(meth)acrylate having 1 to 10 carbon atoms; and a vinyl-based monomer.

The vinyl-based monomer includes styrene, p-methylstyrene, α-methylstyrene, halogen or alkyl-substituted styrene, acrylonitrile and methacrylonitrile, vinyl toluene, and the like.

Examples of compounds that can be included in the monomer mixture include: at least one compound selected from the group consisting of acrylic acid, methacrylic acid, maleic acid, and anhydrides thereof; at least one compound selected from the group consisting of 2-hydroxy ethyl acrylate, 2-hydroxy ethyl methacrylate, 2-hydroxy butyl acrylate, hydroxypropyl methacrylate, and caprolactone acrylate; styrene and/or vinyltoluene; at least one compound selected from the group consisting of methyl methacrylate, ethyl acrylate, ethyl methacrylate, isobutyl acrylate, normal butyl methacrylate, normal butyl acrylate and isopropyl methacrylate.

Meanwhile, the (co)polymer containing the ethylene glycol repeating unit will make it as a hydrophilic surface, which facilitates access to the bacteria existing in the aqueous solution, thereby arranging the bacteria in the area where the singlet oxygen can act effectively, and improving the antibacterial activity.

The (co)polymer containing the ethylene glycol repeating unit may have a weight average molecular weight of 1,000 to 5,000. When the weight average molecular weight of the (co)polymer containing the ethylene glycol repeating unit is too small, crosslinking does not occur sufficiently during curing of the antibacterial polymer coating composition, so that the mechanical properties of the final result may be deteriorated, and overall physical properties or uniformity of performance may be deteriorated.

Examples of the (co)polymer containing the ethylene glycol repeating unit is not particularly limited, but it may be a polymer containing an ethylene glycol repeating unit, or a copolymer containing an ethylene glycol repeating unit and an alkylene glycol repeating unit having a different structure thereto.

More specifically, examples of the (co)polymer containing the ethylene glycol repeating unit include poly(oxyalkylene (Oxy-A1) having 1 to 5 carbon atoms)-poly(oxyalkylene (Oxy-A2) having 1 to 5 carbon atoms) glycol random copolymer. At this time, the number of carbon atoms of the A1 and A2 are different, and at least one of them is 2 carbon atoms.

A more specific example of the (co)polymer containing the ethylene glycol repeating unit may be a polyoxytetramethylene-polyoxyethylene glycol copolymer having a weight average molecular weight of 1,000 to 5,000.

As used herein, the weight average molecular weight means a weight average molecular weight using polystyrene calibration measured by a GPC method.

The antibacterial polymer coating composition may include 10 to 100 parts by weight of the (co)polymer containing the ethylene glycol repeating unit, relative to 100 parts by weight of the (meth)acrylic polyol resin having a number average molecular weight of 3,000 to 20,000.

When the content of the (co)polymer containing the ethylene glycol repeating unit relative to the (meth)acrylic polyol resin having a number average molecular weight of 3,000 to 20,000 is too small, it may be difficult to exhibit antibacterial activity due to the lack of hydrophilic properties. When the content of the (co)polymer containing the ethylene glycol repeating unit relative to the (meth)acrylic polyol resin having a number average molecular weight of 3,000 to 20,000 is too high, curing is difficult and if a curing agent is added to improve the degree of curing, the balance of the hydrophilicity in the matrix may be lost and the antibacterial effect may be reduced, and further, the surface of the coating is soft and thus, can create a place where bacteria can inhabit, which can inhibit the antibacterial effect.

As described above, when the antibacterial polymer coating composition is irradiated with light in the visible light region after curing, the photosensitizer may be reflected to generate active oxygen or the like. For this purpose, the antibacterial polymer coating composition may contain a photosensitizer in a predetermined amount.

Specifically, it may include 0.001 to 5 parts by weight of a photosensitizer relative to 100 parts by weight of the (meth)acrylic polyol resin having a number average molecular weight of 3,000 to 20,000.

Meanwhile, as the photosensitizer, a commonly known compound may be used.

For example, porphine compounds, porphyrin compounds, chlorin compounds, bacteriochlorin compounds, phthalocyanine compounds, naphthalocyanine compounds, 5-aminolevulinate esters, or combinations of two or more thereof may be used.

However, in order to achieve higher antibacterial activity and antibacterial activity-maintaining performance in the final product prepared from the antibacterial polymer coating composition, it is preferable to use a porphine compound or a porphyrin compound. More preferably, as the photosensitizer, a porphin compound or a porphyrin compound in which 1 to 8 phenyl groups introduced with an alkoxy having 1 to 10 carbon atoms is introduced, such as Zn(II) meso-tetra(4-carboxyphenyl) Porphine or 5,10,15,20-tetrakis(4-methoxyphenyl)-porphine may be used.

Meanwhile, the antibacterial polymer film may further include a thermal initiator or a crosslinking agent.

The crosslinking agent can be used without limitation as long as it is capable of crosslinking reaction with a crosslinkable functional group of a (meth)acrylic polyol resin or a (co)polymer containing the ethylene glycol repeating unit, and specifically, an isocyanate-based crosslinking agent such as multifunctional isocyanate can be used.

The crosslinking agent may serve to polymerize the polyol resin to form a coating layer, and also can act to form a crosslinking function with a crosslinkable functional group of the (co)polymer containing the additionally added ethylene glycol repeating unit, and thereby allow the photosensitizer to be well supported in the polymer matrix. Accordingly, the antibacterial polymer coating composition and the polymer film or polymer molded article provided therefrom may have higher antibacterial activities.

The isocyanate-based crosslinking agent may be at least one selected from the group consisting of hexamethylene diisocyanate, isophorone diisocyanate, methylenebis(cyclohexyl isocyanate), trimethyl hexamethylene diisocyanate, meta-tetramethylxylylene diisocyanate, cyclohexylene diisocyanate, tolylene diisocyanate, diphenylmethane-4,4-diisocyanate, phenylene diisocyanate, 4,4-methylenebisdicyclohexyl diisocyanate, and the like.

The content of the isocyanate-based crosslinking agent may be, for example, 10 to 80 parts by weight, or 10 to 50 parts by weight relative to 100 parts by weight of the (meth)acrylic polyol resin having a number average molecular weight of 3,000 to 20,000. Meanwhile, as the initiator, various known initiators can be used, and for example, a thermosetting initiator can be used. As such a thermosetting initiator, a thermal radical initiator such as t-butylpoxy maleic acid, t-butyl hydroperoxide, 2,4-dichlorobenzoyl peroxide, 1,1-di(t-butylperoxy)-3,3,5-trimethylcyclohexane, N-butyl-4,4'-di(t-butylperoxy)valerate, and the like, and various mixtures thereof, may be used. In addition, a cation initiator that functions by heat, for example, a cation-based or protonic acid catalyst such as triflate, a trifluoro boron ether complex compound, trifluoro boron, and the like, various onium salts such as an ammonium salt, a phosphonium salt, and a sulfonium salt, methyltriphenylphosphonium bromide, ethyltriphenylphosphonium bromide, phenyltriphenylphosphonium bromide, acetophenyl benzyl methylsulfonium fluoroboride, and the like may be used.

Meanwhile, the antibacterial polymer coating composition may further include a thermosetting resin containing at least one thermosetting functional group selected from the group consisting of an epoxy group, an oxetanyl group, a cyclic ether group, and a cyclic thioether group.

The thermosetting resin may have a weight average molecular weight of 500 g/mol to 500,000 g/mol, or 1,000 g/mol to 100,000 g/mol, in consideration of the specific use and physical properties of the antibacterial coating composition. As used herein, the weight average molecular weight means a weight average molecular weight using polystyrene calibration measured by a GPC method.

As the thermosetting resin, a commonly known thermosetting binder or the like can be used. For example, as the thermosetting resin, a resin having two or more cyclic ether groups and/or cyclic thioether groups (hereinafter referred to as "cyclic (thio)ether group") in the molecule can be used, and a bifunctional epoxy resin may be used. Another diisocyanate or its bifunctional block isocyanate may also be used.

The thermosetting binder having two or more cyclic (thio)ether groups in the molecule may be a compound having one or two groups selected among 3, 4, or 5-membered cyclic ether groups or 3, 4, or 5-membered cyclic thioether groups in the molecule. Further, the thermosetting binder may be a multifunctional epoxy resin having at least two epoxy groups in the molecule, a multifunctional oxetane resin having at least two oxetanyl groups in the molecule, an episulfide resin having at least two thioether groups in the molecule, or the like.

Specific examples of the multifunctional epoxy resin include a bisphenol A epoxy resin, a hydrogenated bisphenol A epoxy resin, a brominated bisphenol A epoxy resin, a bisphenol F epoxy resin, a bisphenol S epoxy resin, a novolac epoxy resin, a phenol novolac epoxy resin, a cresol novolac epoxy resin, an N-glycidyl epoxy resin, a novolac epoxy resin of bisphenol A, a bixylenol epoxy resin, is biphenol epoxy resin, a chelate epoxy resin, a glyoxal epoxy resin, an amino group-containing epoxy resin, a rubber modified epoxy resin, a dicyclopentadiene phenolic epoxy resin, a diglycidylphthalate resin, a heterocyclic epoxy resin, a tetraglycidyl xylenoyl ethane resin, a silicone modified epoxy resin, and an ε-caprolactone modified epoxy resin. Further, in order to impart a flame retardant property, those in which an element such as phosphorus is introduced in its structure may be used. These epoxy resins are subjected to thermal curing, thereby improving the properties such as adhesion of the cured film, solder heat resistance, and electroless plating resistance.

Specific examples of the multifunctional oxetane resin include multifunctional oxetane compounds such as bis([3-methyl-3-oxetanylmethoxy]methyl)ether, bis([3-ethyl-3-oxetanylmethoxy]methyl)ether, 1,4-bis([3 ethyl-3-oxetanylmethoxy]methyl)benzene, 1,4-bis([3-ethyl-3-oxetanylmethoxy]methyl)benzene, (3-methyl-3-oxetanyl) methyl acrylate, (3-ethyl-3-oxetanyl)methylacrylate, (3-methyl-oxetanyl)methylmethacrylate, (3-ethyl-3-oxetanyl)methylmethacrylate, and their oligomers or copolymers, and besides the foregoing compounds, an etherification product of an oxetane alcohol with a resin having a hydroxyl group such as novolac resin, poly(p-hydroxystyrene), a cardo-type bisphenol compound, a calixarene compound, a calixresorcine arene compound, or silsesquioxane can be used. Other examples include a copolymer of an unsaturated monomer having an oxetane, ring and an alkyl(meth)acrylate.

Examples of the compound having two or more cyclic thioether groups in the molecule include YL 7000, a bisphenol A type of episulfide resin commercially available from Japan Epoxy Resin Co, Ltd. Moreover, one can use an episulfide resin wherein the oxygen atom of the epoxy group of the novolac epoxy resin is replaced with a sulfur atom.

The antibacterial polymer coating composition may further include inorganic fine particles. The inorganic fine particles may be included in the resin composition in a form of being dispersed in the above-mentioned components, for example, a (meth)acrylic polyol resin having a number average molecular weight of 3,000 to 20,000 and/or a (co)polymer containing an ethylene glycol repeating unit.

The inorganic fine particles may be inorganic fine particles having a nano-scale particle size, for example, nano fine particles having a particle size of about 100 nm or less, or about 10 to about 100 nm, or about 10 to about 50 nm. Further, the inorganic fine particles may include, for example, silica fine particles, aluminum oxide particles, titanium oxide particles, zinc oxide particles, or the like.

By including the inorganic fine particles, the hardness of the film prepared from the composition can be further improved. When the total weight of the binder is referred to as 100 parts by weight, the inorganic fine particles may be included in an amount of about 0.1 to about 10 parts by weight, or about 0.1 to about 5 parts by weight.

By including the inorganic fine particles in the above range, it is possible to form an antibacterial coating film having both high hardness and excellent flexibility.

The antibacterial polymer coating composition may further include commonly used additives, such as a UV absorber, a surfactant, an anti-yellowing agent, a leveling agent, and an antifouling agent. Further, since the content thereof is not particularly limited because it can be variously adjusted within a range that does not deteriorate the physical properties of the antibacterial coating film.

Further, an anti-yellowing agent may be included as the additive, and examples of the anti-yellowing agent include a benzophenone-based compound or a benzotriazole-based compound.

The antibacterial polymer coating composition may further include an organic solvent or a surfactant.

The organic solvent may be added at the time of mixing the respective components contained in the antibacterial polymer coating composition, or may be contained in the antibacterial polymer coating composition while the respective components being added in a state of being dispersed in or mixed with the organic solvent. For example, the antibacterial polymer coating composition may include an organic solvent such that the total solid content concentration of the components contained therein is 1 wt. % to 80 wt. %, or 2 to 50 wt. %.

Non-limiting examples of the organic solvent include ketones, alcohols, acetates, and ethers, or mixtures of two or more thereof. Specific examples of the organic solvent include ketones such as methyl ethyl ketone, methyl isobutyl ketone, acetylacetone or isobutyl ketone; alcohols such as methanol, ethanol, n-propanol, i-propanol, n-butanol, i-butanol, and t-butanol; acetates such as ethyl acetate, i-propyl acetate, and polyethylene glycol monomethyl ether acetate; ethers such as tetrahydrofuran and propylene glycol monomethyl ether; or mixtures of two or more thereof.

The type of the surfactant is also not particularly limited, and an anionic surfactant, a cationic surfactant, an amphoteric surfactant, a nonionic surfactant, and the like can be used.

Meanwhile, according to another embodiment of the present disclosure, an antibacterial polymer film comprising a cured product of the antibacterial polymer coating composition can be provided.

As described above, the antibacterial polymer film prepared by curing the antibacterial polymer coating composition not only is easily applicable to various fields and is suitable for mass production, but also can realize high antibacterial activity even when applying light in a visible light region, and particularly, the generated active oxygen remains for a long time compared to previously known antibacterial materials, and thus can achieve high antibacterial efficiency.

The antibacterial polymer film can be obtained by coating the antibacterial polymer coating composition onto a predetermined substrate and photo-curing the coated product. The specific type and thickness of the substrate are not particularly limited, and substrates that are known to be used for the production of a conventional polymer film can be used without particular limitation.

A method and device commonly used for coating the antibacterial polymer coating composition may be used without particular limitation, and for example, a bar coating method such as Meyer bar method, a gravure coating method, a 2-roll reverse coating method, a vacuum slot die coating method, and 2 roll coating method, etc. may be used.

The coating thickness of the antibacterial polymer coating composition may be determined according to the use of the antibacterial polymer film to be finally produced. For example, the antibacterial polymer coating composition may be coated (applied) in a thickness of 1 μm to 1,000 μm.

In the thermal curing step, curing can be performed at a temperature of 100° C. or higher using a commonly known heat source.

In addition, in the step of thermally curing the antibacterial polymer coating composition, nitrogen purging or the like may be carried out in order to apply nitrogen atmosphere conditions.

Meanwhile, according to another embodiment of the present disclosure, an antibacterial polymer coating composition can be provided, comprising: a substrate layer and a photosensitizer, the substrate layer comprising a (meth) acrylic polyol resin having a number average molecular weight of 3,000 to 20,000 and a (co)polymer containing an ethylene glycol repeating unit, and the photosensitizer being dispersed in the substrate layer.

As the substrate layer includes a (meth)acrylic polyol resin having a number average molecular weight of 3,000 to 20,000 and a (co)polymer including an ethylene glycol repeating unit, a predetermined polymer structure may be formed therein, and thus, high antibacterial activity can be maintained for a long period of time even when using light in a visible light region, and antibacterial activity can be adjusted within an appropriate range according to the purpose of use.

When light in a visible light region is irradiated to such an antibacterial polymer film, active oxygen species or free radicals are generated from the photosensitizer contained therein. As described above, the active oxygen can be generated more efficiently, and the time for which the active oxygen remains can be greatly increased.

The substrate layer may include 10 to 100 parts by weight of a (co)polymer containing the ethylene glycol repeating unit relative to 100 parts by weight of the (meth)acrylic polyol resin having a number average molecular weight of 3,000 to 20,000.

When the content of the (co)polymer containing the ethylene glycol repeating unit relative to the (meth)acrylic polyol resin having a number average molecular weight of 3,000 to 20,000 is too small, the antibacterial activity of the antibacterial polymer film including the substrate layer may be deteriorated due to the lack of hydrophilic properties.

When the content of the (co)polymer containing the ethylene glycol repeating unit relative to the (meth)acrylic polyol resin having a number average molecular weight of 3,000 to 20,000 is too high, the mechanical properties of the substrate layer may be deteriorated or the balance of the hydrophilicity in the substrate layer may be lost, and the antibacterial effect may be reduced, and further, the surface of the coating is soft and thus can create a place where bacteria can inhabit, which can inhibit the antibacterial effect.

Further, as described above, the (co)polymer containing the ethylene glycol repeating unit may have a weight average molecular weight of 1,000 to 5,000.

In addition, the antibacterial activity of the antibacterial polymer film measured by JIS R1702 (KS L ISO 27447: 2011 fine ceramics-antibacterial test method of semiconductor photocatalytic material) may be 90% or more, or 90% to 99.99%.

The antibacterial polymer film may have a thickness of 10 μm to 10,000 μm.

Meanwhile, according to yet another embodiment of the present disclosure, an electronic product including the above-mentioned antibacterial polymer film can be provided.

Examples of the electronic product are not particularly limited, and for example, it can be applied to products where harmful bacteria, fungi etc. grow easily, such as a humidifier, a water tank, a refrigerator, an air washer, an aquarium, and an air cleaner.

In order to produce active oxygen or radicals in the antibacterial polymer film, the electronic product may include a light irradiation device. In addition, the electronic product may further include a device for distributing the produced active oxygen or radicals, for example, an air circulation device.

Advantageous Effects

According to the present disclosure, an antibacterial polymer coating composition which can maintain high antibacterial activity for a long period of time even when using light in a visible light region, and can provide an antibacterial material suitable for a mass production process, and an antibacterial polymer film which can maintain high antibacterial activity for a long period of time even when using light in a visible light region can be provided.

BRIEF DESCRIPTION OF THE DRAWING

FIG. 1 schematically shows the results of measuring the antibacterial activity of the polymer films of Example 1 and Comparative Example 1.

Below, the present disclosure will be described in more detail by way of examples.

However, these examples are provided for illustrative purposes only, and should not be construed as limiting the scope of the present disclosure to these examples.

Preparation Example: Preparation of (Meth)Acrylic Polyol Resin

In a synthesis four-necked flask equipped with a thermometer and a stirrer, 20 g of n-butyl acetate, 35 g of methyl methacrylate and 0.25 g of azoisobutyronitrile were inserted, and then the temperature was raised to the reflux temperature, and after the reflux was stabilized, the reflux was maintained for 60 minutes.

Then, 15 g of hydroxyethyl methacrylate, 10 g of styrene, and 10 g of butyl methacrylate were uniformly separated and added dropwise for 180 minutes, and the reaction product was diluted with butyl acetate. Then, the reaction product was cooled to 60° C. to obtain an acrylic polyol resin A having a solid content of 50% (the number average molecular weight using polystyrene calibration measured by GPC method was about 10,000, and the glass transition temperature was 50° C.).

Example: Preparation of Antibacterial Polymer Coating Composition and Antibacterial Polymer Film Example 1

10 g of the (meth)acrylic polyol resin synthesized in Preparation Example, 2 g of Polycerin DC-1800E (polyoxytetramethylene-polyoxyethylene glycol random copolymer having a weight average molecular weight of 1,800 g/mol, manufactured by NOF Corporation), and a photosensitizer [Zn(II) meso-tetra(4-carboxyphenyl) Porphine] were dissolved in toluene at a concentration of 3 mM, and added at a weight ratio of 0.3 relative to 100 weight ratio of the (meth)acrylic polyol resin synthesized in the Preparation Example, and 0.3 g of a curing agent (product name TKA-100) and toluene were further added to prepare an antibacterial polymer coating solution (solid content concentration of 45%).

Then, the coating solution was coated with #20 bar, and then thermally cured in an oven at 120° C. for 2 minutes and aged in an oven at 40° C. for 24 hours to prepare an antibacterial polymer film having a thickness of 10 μm.

Example 2

An antibacterial polymer coating solution (solid content concentration of 50%) and an antibacterial polymer film (thickness of 10 μm) were prepared, except that 2 g of Polycerin DCB-2000 (polyoxytetramethylene-polyoxypropylene glycol random copolymer having a weight average molecular weight of 2000 g/mol, manufactured by NOF Corporation) was used instead of 2 g of Polycerin DC-1800E.

Example 3

An antibacterial polymer coating solution (solid content concentration of 50%) and an antibacterial polymer film (thickness of 10 μm) were prepared in the same manner as in Example 1, except that 4 g of Polycerin DC-1800E was used instead of 2 g of Polycerin DC-1800E.

Example 4

An antibacterial polymer coating solution (solid content concentration of 50%) and an antibacterial polymer film (thickness of 10 μm) were prepared in the same manner as in Example 1, except that 4 g of Polycerin DC-1800E was used instead of 2 g of Polycerin DC-1800E, and 0.6 g of curing agent (trade name TKA-100) was used instead of 0.3 g of curing agent (product name TKA-100).

Comparative Example 1

A polymer film having a thickness of 10 μm was prepared in the same manner as in Example 1, except that the Polycerin DC-1800E was not used.

Experimental Example: Measurement of Antibacterial Activities of Polymer Films of Examples and Comparative Example Experimental Example 1: Evaluation of Antibacterial Activity 1) Preparation of Bacterial Suspension As test bacteria, E. coli ATCC 8739, a standard E. coli specified in the KS L ISO 27447 standard, was used. The E. coli ATCC 8739 strain was inoculated into LB nutrient medium using a platinum loop, cultured at 37° C. for 16 to 24 hours, and then stored in a refrigerator at 5° C. Within 1 month, the above process was replicated and the secondary culture was repeated. During the secondary culture, the maximum number of colony-forming units (CFU) should be 10. The LB nutrient medium was prepared by a process in which 25 g/L of Luria Broth powder and 15 g/L of agar powder (available from Sigma-Aldrich) were mixed with distilled water and sterilized in an autoclave, and when the temperature was lowered to ~40° C., an appropriate amount was quantified in a petri dish.

The bacterial culture was centrifuged to separate the bacteria and the LB liquid medium, and then the bacteria were transferred to a saline solution. The suspension was diluted so that the absorption value of the bacteria-saline solution at 600 nm was 0.5 using a spectrophotometer, and the bacterial suspension was used for the experiment.

In a specific dilution method, each plate was diluted by $1/10$, and the number of CFU was also reduced by $1/10$. The amount of suspension used for plating was 0.1 ml. Since the number of CFU of $C_4$ was 299 and the amount of liquid used was 0.1 ml, 299 CFU/0.1 ml=2,990 CFU/ml. The number of CFU of $C_1$ was ~3.0×10$^6$ CFU/ml multiplied by 1,000, and $C_1$ is one in which a bacterial stock solution (C0) was diluted by $1/10$, so the number of CFU of the bacterial suspension was 3.0×10$^7$ CFU/ml.

2) Inoculation of Bacteria on the Test Specimen 0.2 mL of bacterial suspensions (C1, C2, C3, C4) were each quantified on the previously prepared test specimen, and then a polypropylene adhesive film having a transmittance of 80% or more was disposed thereon, whereby it was prepared in a sandwich structure including a bacterial suspension located between a polymer film carrying a photocatalyst sample and an adhesive film.

2) Antibacterial Test (Light Condition; Light)

For each of the above test specimens, (1) the condition of irradiating 1,000 Lux of White LED for 6 hours and (2) the condition of irradiating 1,000 Lux of Green LED for 6 hours were applied, and (3) the conditions of 405 nm and 0.35 mW/cm$^2$ were compared with (4) the case leaving for 6 hours in each dark condition.

Then, the concentration of bacteria in each sample was confirmed, and the virus reduction factor (R) was calculated according to the following General Formula 1.

$$R=\log_{10}[(V1 \times T1)/(V2 \times T2)] \quad \text{[General Formula 1]}$$

R: virus reduced concentration expressed as log
V1: volume of sample before light treatment
T1: virus concentration of sample before light treatment
V2: volume of sample after light treatment
T2: virus concentration of sample after light treatment

TABLE 1

| | Antibacterial activity | | |
|---|---|---|---|
| | White LED 1,000 Lux 6 hrs | Green LED 1,000 Lux 6 hrs | 405 nm 0.35 mW/cm$^2$ 6 hrs |
| Comparative Example 1 | <log$_{10}$ | <0.5 log$_{10}$ | <0.5 log$_{10}$ |
| Example 1 | 3.6 log$_{10}$ | 2.8 log$_{10}$ | 4.0 g |
| Example 2 | 3.0 log$_{10}$ | 2.6 log$_{10}$ | 4.0 g |
| Example 3 | 4 log$_{10}$ | 2.8 log$_{10}$ | 4.0 g |
| Example 4 | 2.5 log$_{10}$ | 1.9 log$_{10}$ | 3.0 g |

As shown in FIG. 1, it was confirmed that the polymer film prepared from the antibacterial polymer coating composition of Example 1 exhibits higher antibacterial activity compared to the polymer film prepared from the antibacterial polymer coating composition of Comparative Example 1.

More specifically, as shown in the results in Table 1, it was confirmed that the polymer films prepared from the antibacterial polymer coating compositions of Examples 1 to 4 each exhibit a virus reduction factor of about 1.9 log$_{10}$ or 2.0 log$_{10}$ or more, and have an antibacterial activity of about 99% or more. On the contrary, it was confirmed that the polymer film prepared from the antibacterial polymer coating composition of Comparative Example exhibits a virus reduction factor of less than 1 log$_{10}$, and exhibits a lower level of antibacterial activity than Examples.

The invention claimed is:

1. An antibacterial polymer coating composition comprising:
   a (meth)acrylic polyol resin having a number average molecular weight of 3,000 to 20,000;
   a (co)polymer containing an ethylene glycol repeating unit; and a photosensitizer,
   wherein the photosensitizer includes a porphine compound or a porphyrin compound and wherein the porphine compound or the porphyrin compound contains 1 to 8 phenyl groups to which an alkoxy having 1 to 10 carbon atoms is introduced.

2. The antibacterial polymer coating composition according to claim 1, wherein
   the (meth)acrylic polyol resin having a number average molecular weight of 3,000 to 20,000 includes a copolymer of a monomer mixture including an alkyl (meth)acrylate having 1 to 10 carbon atoms; a hydroxyalkyl (meth)acrylate having 1 to 10 carbon atoms; and a vinyl-based monomer.

3. The antibacterial polymer coating composition according to claim 1, wherein
   the (co)polymer containing an ethylene glycol repeating unit has a weight average molecular weight of 1,000 to 5,000.

4. The antibacterial polymer coating composition according to claim 1, wherein
   the (co)polymer containing the ethylene glycol repeating unit includes poly(oxyalkylene (Oxy-A1) having 1 to 5 carbon atoms)-poly(oxyalkylene (Oxy-A2) having 1 to 5 carbon atoms) glycol random copolymer, and
   wherein the number of carbon atoms of the A1 and A2 are different, and at least one of A1 and A2 has 2 carbon atoms.

5. The antibacterial polymer coating composition according to claim 1, wherein
   the (co)polymer containing the ethylene glycol repeating unit is a polyoxytetramethylene-polyoxyethylene glycol copolymer having a weight average molecular weight of 1,000 to 5,000.

6. The antibacterial polymer coating composition according to claim 1, comprising:
   10 to 100 parts by weight of the (co)polymer containing the ethylene glycol repeating unit; and
   0.01 to 5 parts by weight of the photosensitizer,
   based on 100 parts by weight of the (meth)acrylic polyol resin having a number average molecular weight of 3,000 to 20,000.

7. The antibacterial polymer coating composition according to claim 1, further comprising a thermal initiator or a crosslinking agent.

8. The antibacterial polymer coating composition according to claim 7, wherein the crosslinking agent includes a multifunctional isocyanate.

9. An antibacterial polymer film comprising a cured product of the antibacterial polymer coating composition of claim 1.

10. An antibacterial polymer film comprising a substrate layer, wherein the substrate layer comprises a photosensitizer, a (meth)acrylic polyol resin having a number average molecular weight of 3,000 to 20,000 and a (co)polymer containing an ethylene glycol repeating unit, and the photosensitizer is dispersed in the substrate layer, and
   wherein the photosensitizer includes a porphine compound or a porphyrin compound and wherein the porphine compound or the porphyrin compound contains 1 to 8 phenyl groups to which an alkoxy having 1 to 10 carbon atoms is introduced.

11. The antibacterial polymer film according to claim 10, wherein the antibacterial polymer film has a thickness of 10 μm to 10,000 μm.

12. The antibacterial polymer film according to claim 10, wherein the antibacterial polymer has an antibacterial activity of at least 90% as measured according by KS L ISO 27447.

13. The antibacterial polymer film according to claim 10, wherein
   the substrate layer includes 10 to 100 parts by weight of the (co)polymer containing the ethylene glycol repeating unit relative to 100 parts by weight of the (meth) acrylic polyol resin having a number average molecular weight of 3,000 to 20,000.

14. The antibacterial polymer film according to claim 10, wherein
   the (co)polymer containing the ethylene glycol repeating unit has a weight average molecular weight of 1,000 to 5,000.

* * * * *